United States Patent [19]  [11]  4,163,204
Sado et al.  [45]  Jul. 31, 1979

[54] PRESSURE-SENSITIVE RESISTORS

[75] Inventors: Ryoichi Sado, Saitama; Akio Nakamura, Toda; Naoki Kodama, Omiya, all of Japan

[73] Assignee: Shin-Etsu Polymer Co., Ltd., Ninonbashi, Japan

[21] Appl. No.: 973,088

[22] Filed: Dec. 26, 1978

[30] Foreign Application Priority Data

Dec. 30, 1977 [JP] Japan .................. 51-160713

[51] Int. Cl.$^2$ ...................... H01C 10/10; H01C 10/12
[52] U.S. Cl. .................................... 338/114; 338/100; 338/109
[58] Field of Search .................. 338/114, 71, 99, 100, 338/101, 106, 109, 224, 225; 29/610

[56] References Cited

U.S. PATENT DOCUMENTS

2,951,817  9/1960  Myers .............................. 338/114 X
3,386,067  5/1968  Costanzo ........................ 338/114 X

Primary Examiner—C. L. Albritton
Attorney, Agent, or Firm—Hopgood, Calimafde, Kalil, Blaustein & Lieberman

[57] ABSTRACT

The pressure-sensitive resistor comprising an electroconductive elastomer, in which an electroconductive particulate material is dispersed, two electrodes placed on the opposing surfaces of the elastomer, a means for providing a compressive force between the electrodes and a means for adjusting the compressive force, works on a novel principle that the elastomer composite exhibits a positive coefficient in the curve of compression vs. resistance relationship when the compressive force is varied in a region exceeding an inversion point at which the resistance of the elastomer as measured in the direction of compression is minimal. The coefficient in this positive region is smaller than in the ordinary negative region, so that the variable resistance of the resistor can be controlled very delicately together with the decreased contribution of the uncontrollable contact resistance.

2 Claims, 11 Drawing Figures

PRESSURE-SENSITIVE RESISTORS

BACKGROUND OF THE INVENTION

The present invention relates to a novel and improved pressure-sensitive resistor or a pressure-sensitive rheostat.

In the prior art, pressure-sensitive resistor elements of a type is widely known and employed which are composite materials composed of an electrically insulating rubbery elastomer as a matrix and an electroconductive particulate material such as carbon black and metal powders dispersed uniformly in the matrix to form an electroconductive rubbery elastomer to be placed between two opposite electrodes. Such an element is used in a pressure-sensitive resistor since the resistance between the electrodes is varied in accordance with the compressive force applied between the electrodes.

The pressure-sensitive resistor of the above described type has the working point in the region of negative coefficient, i.e. in the region where the resistance between the electrodes is decreased as the compressive force applied between the electrodes is increased. Generally speaking, the gradient of the compressive force vs. resistance characteristic curve is considerably large in the region of negative coefficient so that, in other words, the value of the resistance is varied remarkably even with a slight change in the compressive force. Therefore, although the pressure-sensitive resistor of this type is suitably employed in an electric circuit, for example, to give a threshold resistance to control an on-off switching device, it is inapplicable in the fields where it is essential to obtain a delicate control in the value of variable resistance with high reliability.

In addition, the resistance between the electrodes in these pressure-sensitive resistors is a summation of the resistance of the electroconductive resistor element per se and the contact resistance between the electrodes and the electroconductive rubbery elastomer whereas the above mentioned contact resistance in the known electroconductive rubbery elastomer fluctuates irregularly or uncontrollably in accordance with the indefinable contacting condition between the electrode and the electroconductive rubbery elastomer. What is worse, the proportion of the above mentioned contact resistance to the overall resistance is so large that the value of the variable resistance obtained with such a pressure-sensitive resistor is rather poor in reliability and reproducibility.

SUMMARY OF THE INVENTION

It is therefore an object of the present invention to present a novel and improved pressure-sensitive resistor free from the above described drawbacks in the prior art variable resistors of the pressure-sensitive type.

A further object of the present invention is to present a novel and improved pressure-sensitive resistor with pressure-sensitive resistance element formed with an electroconductive rubbery elastomer free from the drawbacks in the prior art resistors of the pressure-sensitive type on the base of an unexpectedly discovered principle, according to which a minimum point is obtained in the characteristic curve of compressive force vs. resistance at a certain value of the compressive force. Namely, the resistance of an electroconductive rubbery elastomer member decreases as the compressive force applied thereto increases reaching a minimum value and then gradually increases by further increase of the compressive force with a positive coefficient of the compressive force vs. resistance relationship.

Thus the pressure-sensitive resistor of the present invention comprises a pressure-sensitive resistance element which is an electroconductive rubbery elastomer, two electrodes provided on the opposite surfaces of the pressure-sensitive resistance element, a means for providing a compressive force between the electrodes with a strength in excess of the value corresponding to the minimum point in the characteristic curve of the compressive force vs. resistance relationship, and a means for adjusting the compressive force between the electrodes within the range where the characteristic curve of the compressive force vs. resistance has a positive coefficient.

BRIEF DESCRIPTION OF THE DRAWINGS

FIG. 11 is a cross sectional view of a further alternative embodiment of the inventive pressure-sensitive resister with an elastic envelope.

DETAILED DESCRIPTION OF THE PREFERRED EMBODIMENTS

The inventors of the present invention discovered following phenomenon unexpectedly in their work on the behavior of the electroconductive rubbery elastomer element employed conventionally in pressure-sensitive resistors, in particular, in the relationship between the compressive force applied thereto and the resistance through the elastomer. When a compressive force is applied to the electroconductive elastomer with decrease of its thickness, the resistance decreases as the compression increases with a relatively large gradient of the characteristic curve in a graph showing the relationship between the compression taken as the abscissa and the resistance taken as the ordinate. With further increase of the compression, the gradient of the characteristic curve decrease gradually to finally level off at a minimum value while, by the application of further increased compressive force beyond this minimum point, the resistance of the electroconductive elastomer begins to increase contrary to a general expectation with a smaller gradient than in the region of smaller compression where the relationship between the compressive force and the resistance has a negative coefficient unless structural degradation takes place in the body of the electroconductive elastomer.

In further detailed study of this phenomenon of the positive coefficient in the compression vs. resistance relationship undertaken by the inventors, it has been established that the characteristics of the positive coefficient phenomenon depend on several factors including, for example, the shape and amount of the electroconductive particulate material incorporated and dispersed in the matrix of the rubbery elastomer as well as the shape of the elastomer element and the electrodes.

The present invention has been completed on the base of the above discovery and the pressure-sensitive resistor of the invention has the working point within the region of the positive coefficient in the compression vs. resistance relationship. In other words, the electroconductive elastomer in the pressure-sensitive resistor of the invention is always under a compression exceeding the above described miniumum point in the characteristic curve of compression vs. resistance by applying a compressive force between the electrodes so that the uncontrollable fluctuation of the contact resistance between the electrodes and the electroconductive elastomer is minimized to give a regular variation of the resistance solely in accordance with the compressive deformation of the electroconductive elastomer. Accordingly, the performance of the inventive resistor as a pressure-sensitive one is very stable in comprison with conventional ones and, in addition, the smaller gradient in the compression vs. resistance characteristic curve in the region of the positive coefficient that in the region of the negative coefficient permits a very delicate control of the resistance in accordance with the change in the compressive force with increased reliability and reproducibility.

In the following, more detailed description of the present invention is given.

The electroconductive rubbery elastomer (hereinafter abbreviated as conductive rubber) used in the present invention is composed of an electrically insulating rubbery polymer, e.g. natural rubber or a synthetic rubber, as a matrix and an electroconductive filler dispersed uniformly in the matrix such as carbonaceous fillers, e.g. carbon blacks, graphite powder, graft copolymers on carbon black and the like, powders of metals and alloys, e.g. copper, silver, nickel, aluminum, brass, stainless steel and the like, metal-plated insulating powders, e.g. powders of plastics of glasses plated with silver, aluminum and the like, powders of electroconductive organic materials, powders of complex compounds of metals, powders of electroconductive metal oxides, powders of electroconductive metal carbides, powders of electroconductive metal carbonyls as well as comminuted fibers of carbon or metals and the like.

The rubbery polymer as the matrix of the conductive rubber is not limitative insofar as it is susceptible to elastic deformation including natural rubber and synthetic rubbers, e.g. polybutadiene rubber, SBR, NBR, chlorinated polyethylenes, polyisobutylene rubbers, polychloroprene rubbers, silicone rubbers, fluorocarbon rubbers and the like as well as certain thermoplastic resins having elasticity. It is of course that they are used either singly or as a blend of two or more according to need.

Figure 1:
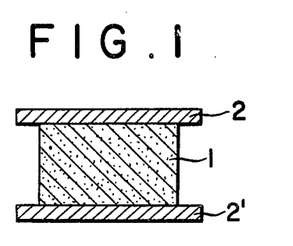
FIG. 1 is a cross sectional view of a basic assemblage of the electroconductive rubbery elastomer member and electrodes.
Figure 2:
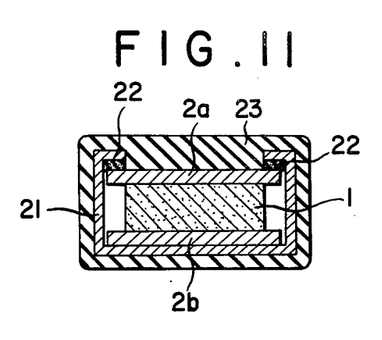
FIG. 2 is a graphic showing of the relationship between the specific resistivity of electroconductive rubbery elastomer member and the loading amounts of the carbonaceous electroconductive fillers.
Figure 2:
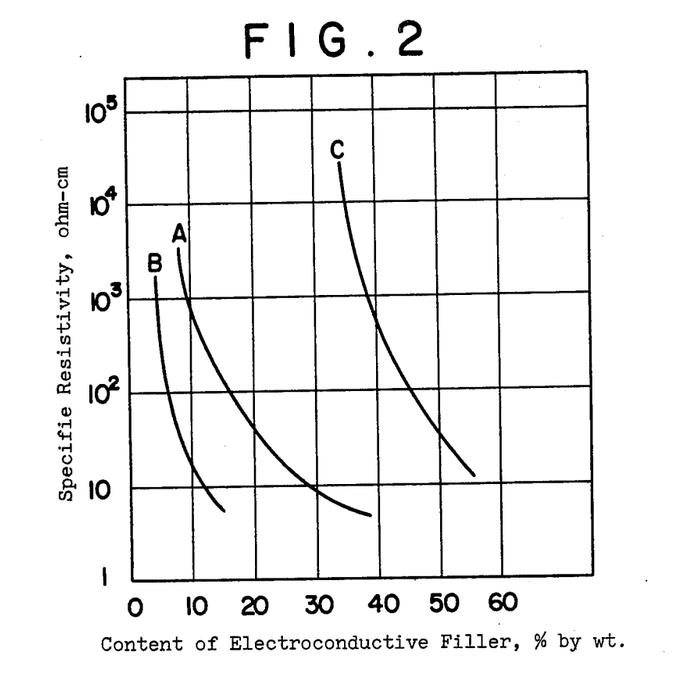

As is stated above, the characteristics in the electroconductivity of the conductive rubbers may depend on various factors. For example, comparative measurements were undertaken to demonstrate the influence of the types of carbonaceous electroconductive fillers on the electroconductivity. Thus, four types of carbonaceous fillers as indicated in Table 1 below were each blended with a commercially available silicone rubber compound prepared with a vinyl-containing dimethylpolysiloxane invaried proportions together with a curing agent. The thus obtained carbon-filled silicone rubber compounds are shaped and cured into cylindrical test specimens and the specific resistivity of the specimen 1 was determined by measuring the resistance between the electrodes 2, 2' applied on to the end surfaces as shown in FIG. 1 to give the results shown in FIG. 2 taking the content of the electroconductive filler in % by weight as the adscissa. The curves A, B and C in FIG. 2 correspond to the electroconductive fillers A, B and C in Table 1, respectively.

Table 1

| | (Types of carbonaceous fillers) | | | |
|---|---|---|---|---|
| Denotation | Type | Manufacturer | Average particle diameter | Specific surface area, $m^2/g$ |
| A | Acetylene black | Denki Kagaku Kogyo | 42 mm | 61 |
| B | Grophitized furnace black | Akzo Chemie | 25 mm | 1000 |
| C | Clay-like graphite | Nippon Kokuen Kogyo | 2.5 $\mu m$ | 25 |
| D | Flaky graphite | Nippon Kokuen Kogyo | 5 $\mu m$ | 18 |

Figure 3:
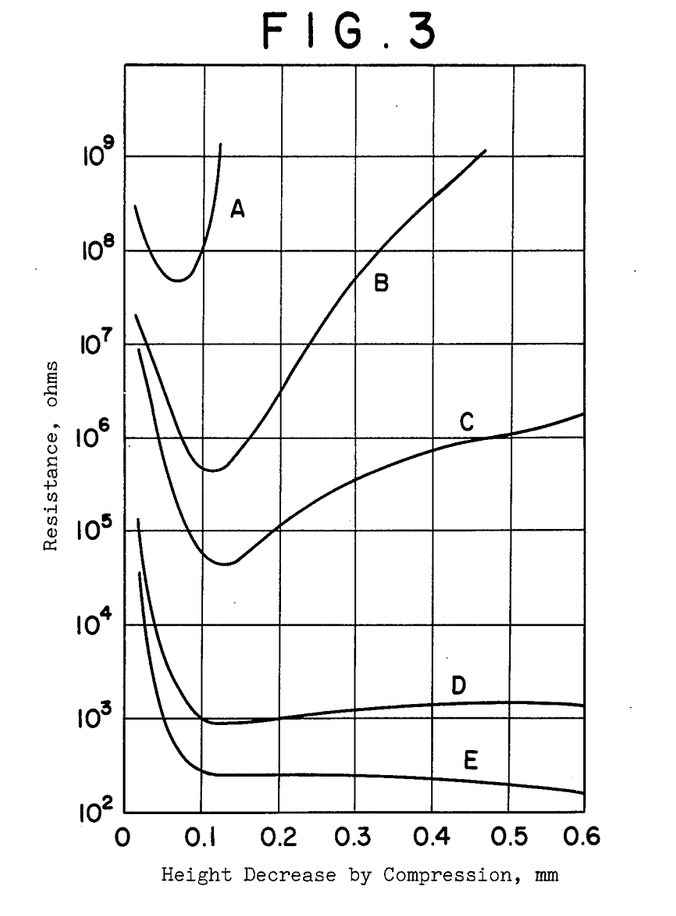
FIG. 3 to FIG. 8 are graphic showings of the compression vs. resistance relationships taking the degree of compression as the abscissa and the value of the resistance as the ordinate.

The measurement of the compression vs. resistance relationship was undertaken with cylindrical test specimens of each 1.6 mm diameter and 1.5 mm height prepared with the above mentioned carbon-filled silicone rubber compounds with electroconductive filler A in varied amounts. Thus, the test specimen was sandwiched with electrodes on the end surfaces of the cylinder with a compressive force between the electrodes and the height decrease of the cylindrical specimen was determined by use of a dial gage along with the measurement of the resistance between the electrodes in a usual manner. The results are shown in FIG. 3 in which the values of the resistance are plotted as a function of the height decrease of the specimen. The contents of the electroconductive filler in the test specimens for the curves A, B, C, D and E of FIG. 3 were 9.35, 9.98, 11.4, 16.9 and 23.75% by weight, respectively.

Figure 4:
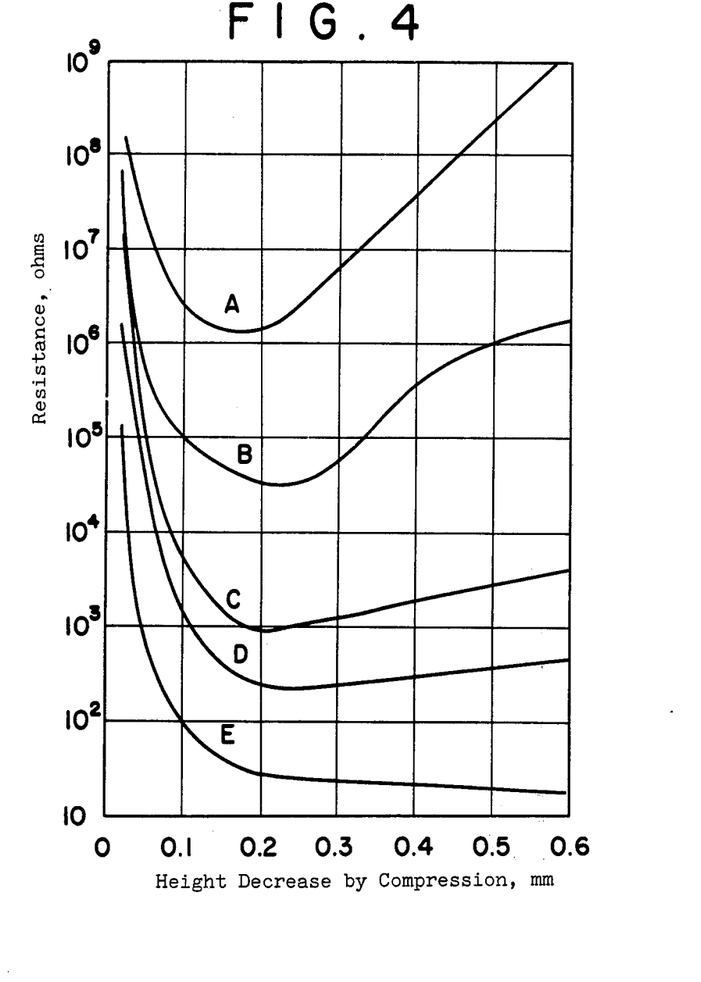
Figure 5:
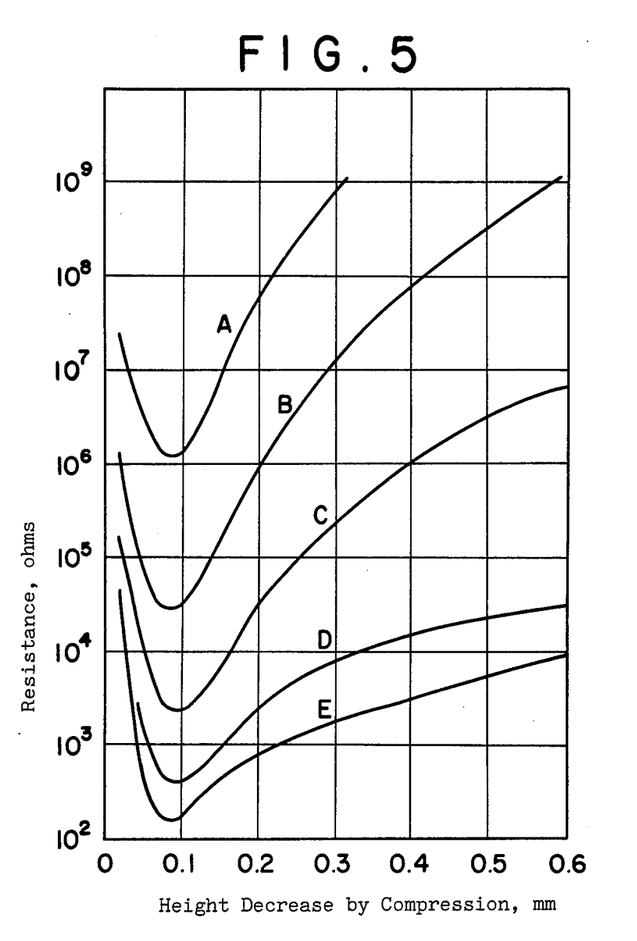

Similar measurements were undertaken with the electroconductive fillers B and C to give the results as shown in FIGS. 4 and 5, respectively, the dimensions of the cylindrical test specimens being 1.6 mm in diameter and 1.0 mm in height. The contents of the electroconductive filler in the test specimens for the curves A, B, C, D and E of FIG. 4 were 3.0, 5.0, 7.9, 10.0 and 16.1% by weight, respectively, and those of FIG. 5 were 2.9, 3.5, 12, 18 and 54% by weight, respectively.

Figure 6:
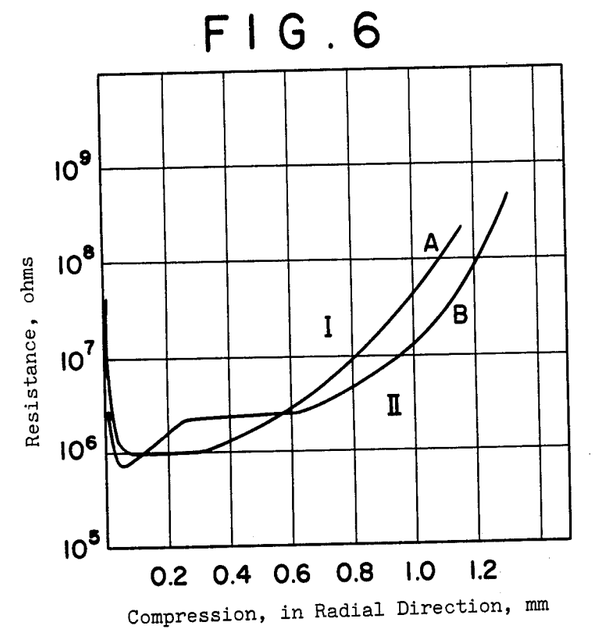
Figure 7:
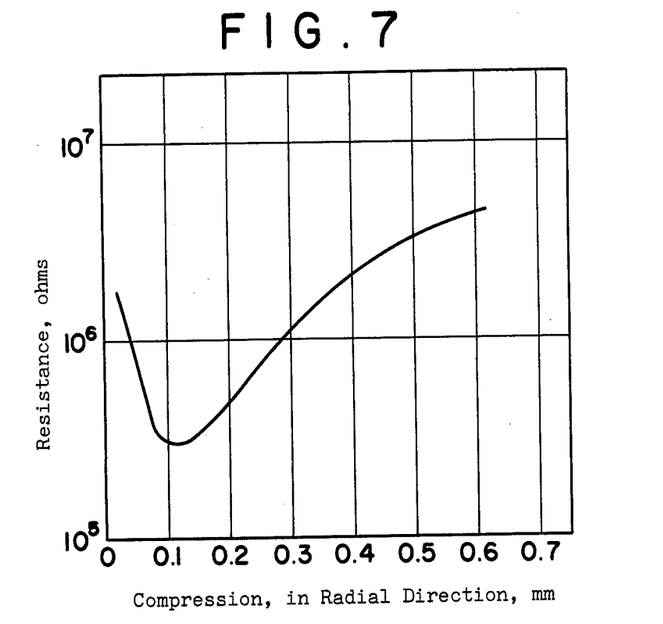

The curves I and II in FIG. 6 were obtained with test epecimens of either a ball of 1.65 mm diameter or a cylinder of 1.6 mm diameter and 1.0 mm height, respectively, prepared with the silicone rubber compound containing the electroconductive filler C in Table 1 in an amount of 35% by weight, the measurement of the resistance being conducted by compressing each of the test specimens in the radial direction. Similarly, the curve in FIG. 7 was obtained by radial compression of a cylindrical test specimen of 1.6 mm diameter and 1.0 mm height prepared with the silicone rubber compound filled with 28% by weight of the electroconductive filler D given in Table 1.

Figure 8:
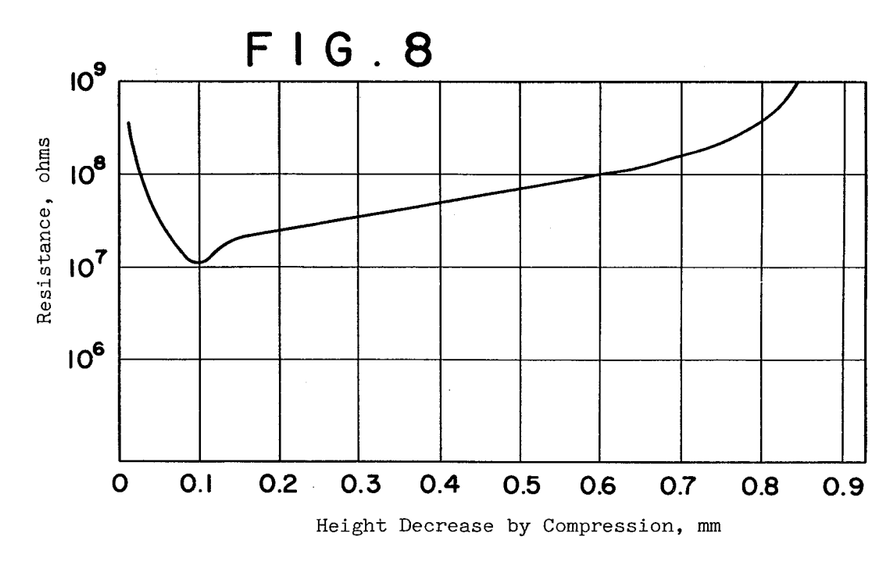

FIG. 8 gives the results of the measurement undertaken in the same conditions as in the measurement of the curve B in FIG. 3 excepting that the electrodes employed here were made of a 100 mesh screen formed with a stainless steel wire of 0.107 mm diameter with 0.147 mm mesh opening.

The mechanism of the anomalous behavior of the compression vs. resistance relationship is not well understood beyond presumption. It may be, however, due to the uneven strain within the body of the electroconductive rubber member under heavy compression. For example, the surfacial portions of the compressed body are stretched by the outward bulging rather than compression as in the core section of the compressed body giving as increased resistivity in the surfacial region so that the resistance of the compressed body as a whole tends to increase beyond a certain inversion point of the compression.

In order to verify the above presumption, following experiments were undertaken.

Thus, 100 parts by weight of a commercially available silicone rubber compound KE 951U (product of Shin-Etsu Chemical Co., Japan), 5 parts by weight of dicumyl peroxide as a curing agent and 1000 parts by weight of a nickel powder passing a 325 mesh screen were blended uniformly and shaped and cured under a pressure of 10 kg/cm$^2$ at 160° C. for 15 minutes into a cylindrical body of 28 mm diameter and 12.8 mm height.

The above obtained cylindrical body was subjected to heat aging at 180° C. for 22 hours as compressed by 25% in the axial direction so as that the compressive strain could by fixed. After cooling and removal of the compressive force, a barrel-shaped body with a largest diameter 30 mm and a height 11.8 mm was obtained.

The specific resistivity of the core portion of 3 mm diameter as cut out from the above barrel-shaped body along its axis was 0.7 ohm-cm while the specific resistivity of the surfacial layer of 1 mm thickness cut from the middle height of the barrel-shaped body was as high as $2.5 \times 10^6$ ohm-cm showing the validity of the above presumption. Incidentally, the specific resistivity of a cylindrical body prepared in the same manner as above except for the absence of the compression during the heat aging treatment was 1.0 ohm-cm throughout.

Further comparative test was undertaken with a cylindrical body of 1.6 mm diameter and 1.0 mm height prepared with the same nickel powder-filled silicone rubber as above and a similar cylindrical body provided with an open hole of 0.3 mm diameter along the axis of the cylinder, i.e. a tubular body with an outer diameter 1.6 mm, an inner diameter 0.3 mm and a height 1.0 mm. Both of the cylindrical body and the tubular body were compressed in the axial direction as sandwiched between electrodes and the relationships between the compression in % and the resistance were measured to give the results as set out in Table 2 below.

Table 2

| Compression in % | 5 | 10 | 20 | 30 | 40 |
|---|---|---|---|---|---|
| Cylindrical body, ohms | 8 | 5 | 3 | 2.5 | 2 |

Table 2-continued

| | | | | | |
|---|---|---|---|---|---|
| Tubular body, ohms | 100 | 350 | $8 \times 10^3$ | $2 \times 10^6$ | $100 \times 10^6$ |

The above results are surprising in showing that the region in contribution to the decrease in the resistance under compression is limited to a very small core portion and the outer region exhibits a positive coefficient of the compression vs. resistance relationship even under a compression of as small as 5% or more. This anomalous behavior is less remarkable when the electroconductive filler is highly structural and with a fine particle size distribution and when the loading amount of the filler is large since the increase in the resistance is caused by the increase of the distances between the filler particles in the region under stretching.

Therefore, the electroconductive filler to be incorporated in the electroconductive rubbery elastomer used in the present invention should be selected taking into account the above described characteristics according to the properties required in the finished pressure-sensitive resistor although it is not specifically limitative with respect to the material of the powder, loading amount and the shape of the particles. Further it is of course that the rubbery elastomers per se exhibit different behaviors according to the hardness and the shape but are not specifically limitative with respect to the mechanical properties, especially, permanent compression set insofar as not readily destroyable under compression.

Figure 9:
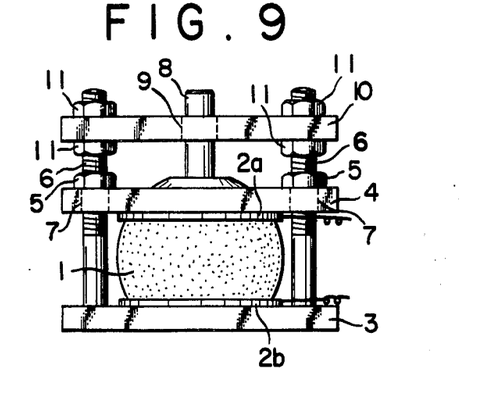
FIG. 9 is a cross sectional view of the inventive pressure-sensitive resistor operated by mechanical pushing.

The pressure-sensitive resistor of the present invention is constructed, as given previously, with an electroconductive rubbery elastomer member, two electrodes bonded or applied to the opposite surfaces of the above electroconductive rubbery elastomer member, a means for providing a compressive force between the electrodes in excess of the force corresponding to the inversion point in the compression vs. resistance characteristics and a means for adjusting the compressive force between the electrodes within the range where the characteristic curve of the compression vs. resistance relationship has a positive coefficient. The basis structure of such a pressure-sensitive resistor is shown in FIG. 9 illustrating a cross sectional view. In FIG. 9, 1 is an electroconductive rubbery elastomer member, and 2a and 2b are the upper and lower electrodes in contact with the upper and lower surfaces of the elastomer member 1 sandwiched between the lower base plate 3 and the pushing plate 4. The height of the pushing plate 4 is limited by the nuts 5,5 screwed on the supporting bolts 6,6 erected on the lower base plate 3 so as that the electroconductive rubbery elastomer member 1 is under compression slightly in excess of the inversion point in the compression vs. resistance characteristic curve.

The supporting bolts 6,6 penetrate the pushing plate 4 through the openings 7,7 with a play so that the pushing plate 4 can be displaced downwardly when it receives an additional downward force counteracting the elastic resilience of the elastomer member 1. Such as additional downward force is given by the pushing rod 8 in contact with the upper surface of the pushing plate 4 which is movable as guided by the guide opening 9 in the upper base plate 10 securely fixed to the supporting bolts 6,6 by a suitable means such as the pairs of nuts 11. With this configuration of the parts, the electroconductive rubbery elastomer member 1 is always under compression in excess of the inversion point of the compression vs. resistance relationship but yet adjustable within the region of the positive coefficient of the relationship by pressing down the pushing rod 8.

Figure 10:
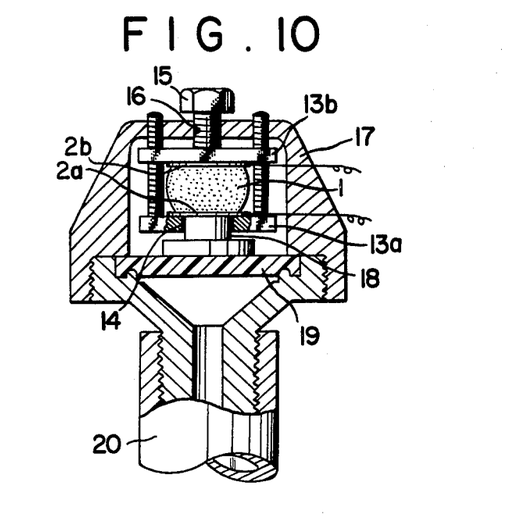
FIG. 10 is a cross sectional view of another embodiment of the inventive pressure-sensitive resistor operated by a hydrodynamic pressure.

FIG. 10 illustrates as alternative embodiment of the inventive pressure-sensitive resistor operated with a hydrodynamic pressure. In FIG. 10, 1 is the electroconductive rubbery elastomer member sandwiched with the electrodes 2a and 2b as secured between the base plates 13a and 13b, which latter being provided with an opening 14. The distance between these base plates 13a and 13b is adjustable by screwing a screw 15 through the screwed opening 16 in the housing 17 so as that the elastomer member 1 is always under compression in excess of the inversion point in the compression vs. resistance relationship. One of the electrodes 2a in contact with the base plate 13a is further contacted with a presser 18 penetrating the opening 14 in the base plate 13a while the presser 18 is in contact with a diaphragm 19 at the other end thereof and the diaphragm 19 is under a hydrodynamic pressure on the other surface with the fluid led by the piping 20.

When the base plate 13b is fixed at an appropriate position by turning the screw 15 so as that the elastomer member 1 is under compression slightly in excess of the inversion point of the compression vs. resistance relationship with the hydrodynamic pressure on the diaphragm 19 equal to a certain lower limiting value, say, atmospheric pressure, the increase in the hydrodynamic pressure exerts and additional compression to the conductive rubber member 1 so that the resistance between the electrodes 2a, 2b increases as the hydrodynamic pressure increases.

In FIG. 11, 1 is the electroconductive rubbery elastomer member, 2a and 2b are upper and lower electrodes, 21 is a rigid frame and 22 is an elastic spacer member under compression. The elastic spacer member 22 is formed with a rubbery elastomer but it is optional that this member is a coiled spring on leaf spring made of, for example, a metal such as phosphorous bronze.

The conductive rubber member 1 is always under compression by the elastic resilience of the elastic spacer member 22 in excess of the inversion point of the compression v.s. resistance relationship.

Whole of the above described assemblage is airtightlly sealed in an envelope 23 formed with an electroinsulating rubber to ensure water-proofness of the resister, through which the upper electrode 2a receives an additional compressive force from outside so as that the compression in the conductive rubber member 1 is adjustable in the region where the compression v.s. resistance relationship has a positive coefficient.

Owing to the compactness in size, easiness in assembling and excellent anti-shock resistance, the pressure-sensitive resistor of the present invention can be very advantageously employed in various electric or electronic devices, for example, as a detector in measuring instruments, controlling element in current or voltage regulators, input transducer in multiterm input units, variable resistor element in contactless key-boards of electronic devices such as electronic computers, electronic musical instruments, telephones, electronic pocketable calculators, radio and television sets and the like, and controller element in air conditioners.

What is claimed is:

1. A pressure-sensitive variable resistor comprising
(a) an electroconductive rubbery elastomer member composed of an electically insulating rubbery elastomer as a matrix and an electroconductive powder uniformly dispersed in the matrix,
(b) a pair of electrodes provided in contact with the opposite surfaces of the electroconductive rubbery elastomer member,
(c) a means for giving a compressive force between the electrodes sufficient to keep the electroconductive rubbery elastomer member under compression to an extent exceeding the value with which the electric resistance between the electrodes is minimal and beyond which the electric resistance between the electrodes increases as the compression increases, and
(d) a means for adjusting the compression given to the electroconductive rubbery elastomer member in a region where the electric resistance between the electrodes increases as the compression increases.

2. The pressure-sensitive variable resistor as claimed in claim 1 wherein the electroconductive rubbery elastomer member has an open hole through the core portion thereof along the direction of compression.

* * * * *